(12) United States Patent
Sakai et al.

(10) Patent No.: US 7,953,168 B2
(45) Date of Patent: May 31, 2011

(54) RECEIVER, TRANSMISSION METHOD AND TRANSMISSION SYSTEM

(75) Inventors: Hideaki Sakai, Kyoto (JP); Kazunori Hayashi, Kyoto (JP); Yoji Okada, Osaka (JP)

(73) Assignees: Sumitomo Electric Industries, Ltd., Osaka (JP); Kyoto University, Kyoto (JP)

( * ) Notice: Subject to any disclaimer, the term of this patent is extended or adjusted under 35 U.S.C. 154(b) by 203 days.

(21) Appl. No.: 11/992,047

(22) PCT Filed: Sep. 15, 2006

(86) PCT No.: PCT/JP2006/318431
§ 371 (c)(1),
(2), (4) Date: Mar. 24, 2009

(87) PCT Pub. No.: WO2007/032497
PCT Pub. Date: Mar. 22, 2007

(65) Prior Publication Data
US 2009/0268825 A1 Oct. 29, 2009

(30) Foreign Application Priority Data
Sep. 16, 2005 (JP) ................... 2005-271081

(51) Int. Cl.
*H04L 27/28* (2006.01)
(52) U.S. Cl. ........ 375/260; 375/340; 375/346; 375/295; 375/147; 375/222; 375/348
(58) Field of Classification Search .............. 375/260, 375/346, 146, 147, 216, 340, 267; 370/203, 370/204, 205, 206, 207, 208, 209, 210
See application file for complete search history.

(56) References Cited

U.S. PATENT DOCUMENTS

| 7,526,042 B2 * | 4/2009 | Yoshida ................. 375/285 |
| 2006/0159187 A1 * | 7/2006 | Wang et al. ............. 375/260 |

FOREIGN PATENT DOCUMENTS

| JP | 2004-208254 | 7/2004 |
| JP | 2004-229198 | 8/2004 |
| JP | 2005-79911 | 3/2005 |

OTHER PUBLICATIONS

Kazunori Hayashi, "Fundamentals of Modulation/Demodulations and Equalization Technologies", Proc. MWE 2004, pp. 523-532, 2004.

(Continued)

*Primary Examiner* — Shuwang Liu
*Assistant Examiner* — Dhaval Patel
(74) *Attorney, Agent, or Firm* — McDermott Will & Emery LLP

(57) ABSTRACT

To reduce the influence of inter-block interference even when the order number of the channel (physically corresponding to the impulse response length of the channel) is larger than the CP length. A receiver 20 for a transmission system using a block including a plurality of symbols, comprises a transfer function estimating part 21 which estimates a transfer function of a channel, and an inter-block interference component generating part 24 which generates a replica of an inter-block interference component from a previous block to a current block in accordance with the transfer function h estimated in the transfer function estimating part 21 and a received signal s(n−1) of the previous block, wherein the inter-block interference component of a received signal is reduced by using the replica of the inter-block interference component.

6 Claims, 7 Drawing Sheets

OTHER PUBLICATIONS

Hayashi et al. "A Simple Interference Elimination Scheme for Single Carrier Block Transmission with Insufficient Cyclic Prefix", Proceedings of the 7th International Symposium on Wireless Person Multimedia Communications, Sep. 2004, vol. 2, pp. 577-581.

Andreas Czylwik, "Comparison Between Adaptive OFDM and Single Carrier Modulation with Frequency Domain Equalization", Vehicular Technology Conference, 1997, IEEE 47th, Mar. 1997, pp. 865-869.

Naofal Al-Dhahir, "Single-Carrier Frequency-Domain Equalization for Space-Time Block-Coded Transmissions Over Frequency-Selective Fading Channels", IEEE Communications Letters, Jul. 2001, vol. 5, No. 7, pp. 304-306.

* cited by examiner

RECEIVER, TRANSMISSION METHOD AND TRANSMISSION SYSTEM

RELATED APPLICATIONS

This application is the U.S. National Phase under 35 U.S.C. §371 of International Application No. PCT/JP2006/318431, filed on Sep. 15, 2006, which in turn claims the benefit of Japanese Application No. 2005-271081, filed on Sep. 16, 2005, the disclosures of which applications are incorporated by reference herein.

TECHNICAL FIELD

The present invention relates to a receiver, a transmission method and a transmission system and more preferably to a transmission system using a block in which a redundant signal such as a cyclic prefix (refer it to as a "CP", hereinafter) is inserted to avoid an inter-block interference from a previous block to a current block.

BACKGROUND ART

In the field of a high speed digital transmission, a transmission system is known that transmits a block having the CP added to data (a transmitted signal) as shown in FIG. 2. The CP is formed by copying the last K symbols of a data main body part (a useful block time) composed of M symbols before the data main body part.

As such a transmission system, an OFDM (Orthogonal Frequency Division Multiplexing) system or a single carrier block transmission system with cyclic prefix (refer it to as a SC-CP, hereinafter) to which the cyclic prefix is applied is well-known.

Here, a received signal comes under an influence by a channel and a process for removing this influence in a receiver is referred to as an equalizing process. The equalizing process is ordinarily realized by a filter having performance inverse to the transfer function of the channel.

As shown in FIG. 7, in the block transmission system using the cyclic prefix (SC-CP), an equalizer 100 of a discrete frequency domain is used. In this frequency domain equalizer, a received signal vector after the CP is removed is discrete Fourier transformed, multiplied by a weight for each frequency component in a transformed domain and returned again to a signal of a time domain by an inverse discrete Fourier transform to realize an equalization.

The functions of other structures in FIG. 7 will be apparent from the explanation of below-described embodiments.

Non-Patent Document 1 discloses that when a CP is added to a transmitted signal block, an inter-block interference can be removed by frequency domain equalizer (FDE) and a performance of it is improved.

The inter-block interference (refer it also to as an "IBI", hereinafter) arises in such a way that a delayed signal of a previous block generated in the channel is overlapped on a signal of a current block. When it is assumed that the CP is inserted as the guard interval between the blocks, even if the delayed signal of the previous block remains within the CP of the current block, an influence by the inter-block interference can be removed.

In order to explain the above-described thing in detail below, a process from the transmitting signal to the equalizing process is numerically expressed. Initially, in a transmitter, the transmitted signal is divided into blocks at intervals of M symbols (form a useful block time). In a below-described equation (1), n indicates a number attached to each block.

[Equation 1]
$$s(n)=[s_0(n),s_1(n),\ldots,s_{M-1}(n)]^T \quad (1)$$

The CP is added to the useful block so that a block having the CP is formed and this block is transmitted.

[Equation 2]
$$\tilde{s}(n)=T_{CP}s(n) \quad (2)$$

In this case, $T_{CP}$ represents an operation for copying the last K components of the useful block s(n) in the head part in order just as it is.

[Equation 3]
$$T_{CP} = \begin{bmatrix} 0_{K\times(M-K)} I_K \\ I_M \end{bmatrix} \quad \text{Matrix size: } (M+K)\times M \quad (3)$$

Assuming that an impulse response of the channel (a communication path) is $h=\{h_0, h_1, \ldots, h_L\}$, a received signal block in the receiver is expressed by a below-described equation.

[Equation 4]
$$\tilde{r}(n) = [\tilde{r}_0(n), \ldots, \tilde{r}_{M+K-1}(n)]^T \quad (4)$$
$$= H\begin{bmatrix} \tilde{s}(n-1) \\ \tilde{s}(n) \end{bmatrix}$$

In this case, H is expressed as shown below.

[Equation 5]
$$H = \begin{bmatrix} 0 & \cdots & h_L & \cdots & h_0 & 0 & \cdots & 0 \\ \vdots & \ddots & \ddots & & \ddots & \ddots & & \vdots \\ \vdots & & & \ddots & \ddots & & \ddots & 0 \\ 0 & \cdots & \cdots & \cdots & 0 & h_L & \cdots & h_0 \end{bmatrix} \quad (5)$$

Matrix size: $(M+K)\times 2(M+K)$

Further, H is decomposed to two submatrices of $(M+K)\times(M+K)$,

[Equation 6]
$$H_1 = \begin{bmatrix} 0 & \cdots & h_L & \cdots & h_1 \\ \vdots & \ddots & \ddots & & \vdots \\ \vdots & & & \ddots & h_L \\ \vdots & & & & \vdots \\ 0 & \cdots & \cdots & \cdots & 0 \end{bmatrix} \quad (6)$$

[Equation 7]
$$H_0 = \begin{bmatrix} h_0 & & & \\ \vdots & h_0 & 0 & \\ h_L & & \ddots & \\ & \ddots & & \ddots \\ 0 & & h_L & \cdots & h_0 \end{bmatrix} \quad (7)$$

the received signal block is expressed as described below.

[Equation 8]

$$\check{r}(n) = H_1\check{s}(n-1) + H_0\check{s}(n) + \check{n}(n) \qquad (8)$$
$$= H_1 T_{CP}s(n-1) + H_0 T_{CP}s(n) + \check{n}(n)$$

Matrix size: $(M+K) \times 1$

Here, a first term of the right side of the equation (8) shows a signal component from a (n−1) th transmitting block and represents a component of the inter-block interference (IBI).

At a receiver, the CP is removed. This is expressed by a below-described equation.

[Equation 9]

$$r(n) = R_{CP}\check{r}(n) \qquad (9)$$
$$= R_{CP}H_1 T_{CP}s(n-1) + R_{CP}H_0 T_{CP}s(n) + R_{CP}\check{n}(n)$$

Matrix size: $M \times 1$

In this case,

[Equation 10]

$$R_{CP} = [0_{M \times K} \; I_M] \text{ Matrix size: } M \times (M+K) \qquad (10)$$

At this time, for the length K of the CP and the order number L of the channel (physically corresponding to the impulse response length of the channel), $K \geq L$ is assumed. That is, when the length K of the CP is equal to or larger than the order number L of the channel, since $R_{CP}H_1 = 0$, irrespective of the transmitted signal block, the received signal r(n) after the CP is removed is expressed by a below-described equation and the inter-block interference component is removed.

[Equation 11]

$$r(n) = R_{CP}H_0\check{s}(n) + R_{CP}\check{n}(n) \qquad (11)$$
$$= R_{CP}H_0 T_{CP}s(n) + R_{CP}\check{n}(n)$$

When $R_{CP}H_0T_{CP}$ of the equation (11) is expanded, a below-described equation is obtained.

[Equation 12]

$$R_{CP}H_0T_{CP} = \begin{bmatrix} h_0 & 0 & \cdots & 0 & h_L & \cdots & h_1 \\ \vdots & h_0 & \ddots & & \ddots & \ddots & \vdots \\ h_L & \ddots & \ddots & & & \ddots & h_L \\ 0 & \ddots & & \ddots & & & 0 \\ \vdots & \ddots & \ddots & & \ddots & \ddots & \vdots \\ \vdots & & \ddots & \ddots & & \ddots & 0 \\ 0 & \cdots & \cdots & 0 & h_L & \cdots & h_0 \end{bmatrix} = C_{CP} \qquad (12)$$

A matrix having such a structure as shown in the equation (12) is called a circulant matrix which can be transformed using a unitary similarity by a "discrete Fourier transform" (DFT) matrix.

When the nature of the circulant matrix is used, a below-described equation can be obtained.

[Equation 13]

$$C_{CP} = D^H \Lambda D \qquad (13)$$

In this case,

[Equation 14]

$$\Lambda = \begin{bmatrix} \lambda_0 \\ \vdots \\ \lambda_{M-1} \end{bmatrix} = D \begin{bmatrix} h_0 \\ \vdots \\ h_L \\ 0_{(M-L-1)} \end{bmatrix} \qquad (14)$$

[Equation 15]

$$D = \begin{bmatrix} 1 & 1 & \cdots & 1 \\ 1 & e^{-j\frac{2\pi \times 1 \times 1}{M}} & \cdots & e^{-j\frac{2\pi \times 1 \times (M-1)}{M}} \\ \vdots & \vdots & \ddots & \vdots \\ 1 & e^{-j\frac{2\pi \times (M-1) \times 1}{M}} & \cdots & e^{-j\frac{2\pi \times (M-1) \times (M-1)}{M}} \end{bmatrix} \qquad (15)$$

When a noise component of a second term of the right side of the equation (11) is replaced by n(n), the received signal r(n) after the CP is removed can be expressed as described below.

[Equation 16]

$$r(n) = D^H \Lambda D s(n) + n(n) \qquad (16)$$

The equalizing process after the CP is removed is expressed by an equation as described below. The frequency domain equalizer uses discrete Fourier transform for the received signal block after the CP is removed, multiplies the received signal block by a weight for each frequency component in the frequency domain and returns again to a signal of a time domain by an inverse discrete Fourier transform. Assuming that the discrete frequency domain weight is expressed as a diagonal matrix, whose diagonal element is $\{\gamma_0, \ldots, \gamma_{M-1}\}$, an output of the equalizer is expressed by a below-described equation.

[Equation 17]

$$\hat{s}(n) = (D^H \Gamma D) D^H \Lambda D s(n) \qquad (17)$$
$$= D^H \Gamma \Lambda D s(n)$$

Further, Non-Patent Document 1 discloses an equalizer weight of a zero forcing (ZF) criterion and an equalizer weight of a minimum mean-square-error (MMSE) criterion.

ZF Equalizer Weight

[Equation 18]

$$\gamma_i = \frac{1}{\lambda_i}, \qquad (18)$$
$$i = 0, \ldots, M-1$$

MMSE Equalizer Weight

[Equation 19]

$$\gamma_i = \frac{\lambda_i^*}{|\lambda_i|^2 + \sigma_n^2/\sigma_s^2}, i = 0, \ldots, M-1 \qquad (19)$$

$\sigma_s^2$ is a variance of a signal s(n) and, $\sigma_n^2$ is a variance of noise n(n)

Here, Λ denotes the diagonal matrix with diagonal element which is $\{\lambda_0, \ldots, \lambda_{M-1}\}$ of the discrete Fourier transform of the impulse response of the channel obtained from the equation (14). Simulation examples using these weights are also disclosed in the Non-Patent Document 1 (FIG. 8). The MMSE criterion equalizer of the single carrier block transmission system is more excellent in its performance than the ZF criterion equalizer.

A main reason why the ZF criterion equalizer is inferior to the MMSE criterion equalizer is a noise enhancement. The noise enhancement is a phenomenon that when a channel response of a communication path in a certain frequency i ($0 \leq i \leq M-1$) is 0 or near to 0, a weight in the frequency i shows a very large value so that noise is amplified.

Non-Patent Document 1: Kazunori Hayashi "Fundamentals of Modulation/Demodulation and Equalization Technologies) Proc. MWE2004, pp. 523-532, 2004.

DISCLOSURE OF THE INVENTION

Problems that the Invention is to Solve

As described above about the equations (9) and (11), in order to avoid the inter-block interference, the delayed signal of the previous block needs to remain within the CP of the current block and a situation must be avoided that the delayed signal of the previous block exceeds the CP of the current block.

Namely, in order to avoid the inter-block interference, for the length K of the CP and the order number L of the channel (physically corresponding to the impulse response length of the channel), $K \geq L$ needs to be established. That is, the length K of the CP needs to be equal to or larger than the order number L of the channel.

On the contrary, when the order number L of the channel is longer than the length K of the CP, the performance of the frequency domain equalizer suffers from IBI abruptly.

On the other hand, since the order number of the channel is varied depending on a communication environment, when the length of the CP is to be determined with a margin to avoid the inter-block interference, the length K of the CP needs to be increased. Thus, a rate of the CP occupied in the block is increased and a rate of the useful block length is reduced and deteriorate a channel capacity.

Thus, it is an object of the present invention to reduce an influence of an inter-block interference even when an order number of a channel (physically corresponding to an impulse response length of a channel) is larger than the length of a redundant signal such as a CP.

Means for Solving the Problems

The present invention concerns a receiver for a transmission system using a block including a plurality of symbols. The receiver for a transmission system comprises: a transfer function estimating part that estimates a transfer function of a channel; and an inter-block interference component generating part that generates a replica of an inter-block interference component from a previous block to a current block in accordance with the transfer function estimated in the transfer function estimating part and a received signal of the previous block and is characterized in that the inter-block interference component of a received signal is reduced by using the replica of the inter-block interference component.

According to the present invention, since the replica of the inter-block interference component is generated so that the inter-block interference component can be reduced, even when the order number of the channel is larger than the length of a redundant signal, an influence of the inter-block interference can be reduced.

Further, according to the present invention, since the inter-block interference component can be reduced by the replica of the inter-block interference component, even when the block does not have the redundant signal (the length of the redundant signal=0), the influence of the inter-block interference can be reduced. That is, even when the order number of the channel is larger than the length (including the length of the redundant signal=0) of the redundant signal, the influence of the inter-block interference can be reduced, a good bit error rate can be obtained and a transmission of high reliability can be realized.

The block preferably has the redundant signal serving as a guard interval to the inter-block interference from the previous block to the current block. Further, the redundant signal preferably includes a cyclic prefix. The redundant signal may include other signal than the cyclic prefix.

An equalizer is preferably provided that carries out a process for reducing, by the calculation of a prescribed equation, an interference component between the symbols generated depending on whether a cyclic prefix length is small or cyclic prefix does not exist, from the received signal in which the inter-block interference component is reduced. When the length of the cyclic prefix is small or the cyclic prefix does not exist, a received signal block after the inter-block interference component is reduced includes a new interference component between the symbols that cannot be satisfactorily equalized in the usual process explained in the background art. However, the interference component between the symbols can be reduced by the equalizer for reducing the interference component between the symbols. In this case, as prescribed equations, for instance, an equation (26), an equation (27) and an equation (28) in a below-described embodiment can be used. The detail of these equations is explained in the below-described embodiment.

"When the cyclic prefix does not exist" includes a case that the block has a redundant signal, however, the redundant signal does not include the cyclic prefix or a case that the block does not have a redundant signal.

Further, an inter-symbol interference component generating part is preferably provided that generates a replica of an interference component between the symbols in the current clock in accordance with the received signal in which the inter-block interference component is reduced and the estimated transfer function of the channel. The interference component between the symbols of the received signal is preferably reduced by using the replica of the interference component between the symbols. Thus, performance can be more improved.

The inter-symbol interference component generating part preferably carries out a calculation by any one of equations (34) to (36) in a below-described embodiment to obtain a decided value as a transmitted signal block, which is used for generating the replica of the interference component between the symbols, from the received signal in which the inter-block interference component is reduced. The detail of these equations (34) to (36) will be described in the below-described embodiment.

The inter-symbol interference component generating part is preferably formed so as to generate the replica of the interference component between the symbols from the decided value as the transmitted signal block in accordance with equations (37) to (41) in the below-described embodiment. In this case, the calculation of signal processing can be faster and performances can be more improved.

The receiver preferably includes an order number decision part that estimates the order number of the channel to decide whether or not the order number of the channel is larger than the length of the redundant signal. In this case, the receiver can grasp order number of the channel to carry out a proper process.

The present invention concerns a transmission method that transmits a block including a plurality of symbols. The transmission method comprises a step of estimating a transfer function of a channel; a step of generating a replica of an inter-block interference component from a previous block to a current block in accordance with the estimated transfer function and a received signal of the previous block; and a step of reducing the inter-block interference component of a received signal by using the replica of the inter-block interference component.

The present invention concerns a transmission system that transmits a block including a plurality of symbols from a transmitter and receives the block by a receiver. The receiver comprises: a transfer function estimating part that estimates a transfer function of a channel; and an inter-block interference component generating part that generates a replica of an inter-block interference component from a previous block to a current block in accordance with the transfer function estimated in the transfer function estimating part and a received signal of the previous block and is characterized in that the inter-block interference component of a received signal is reduced by using the replica of the inter-block interference component.

BEST MODE FOR CARRYING OUT THE INVENTION

Figure 1:
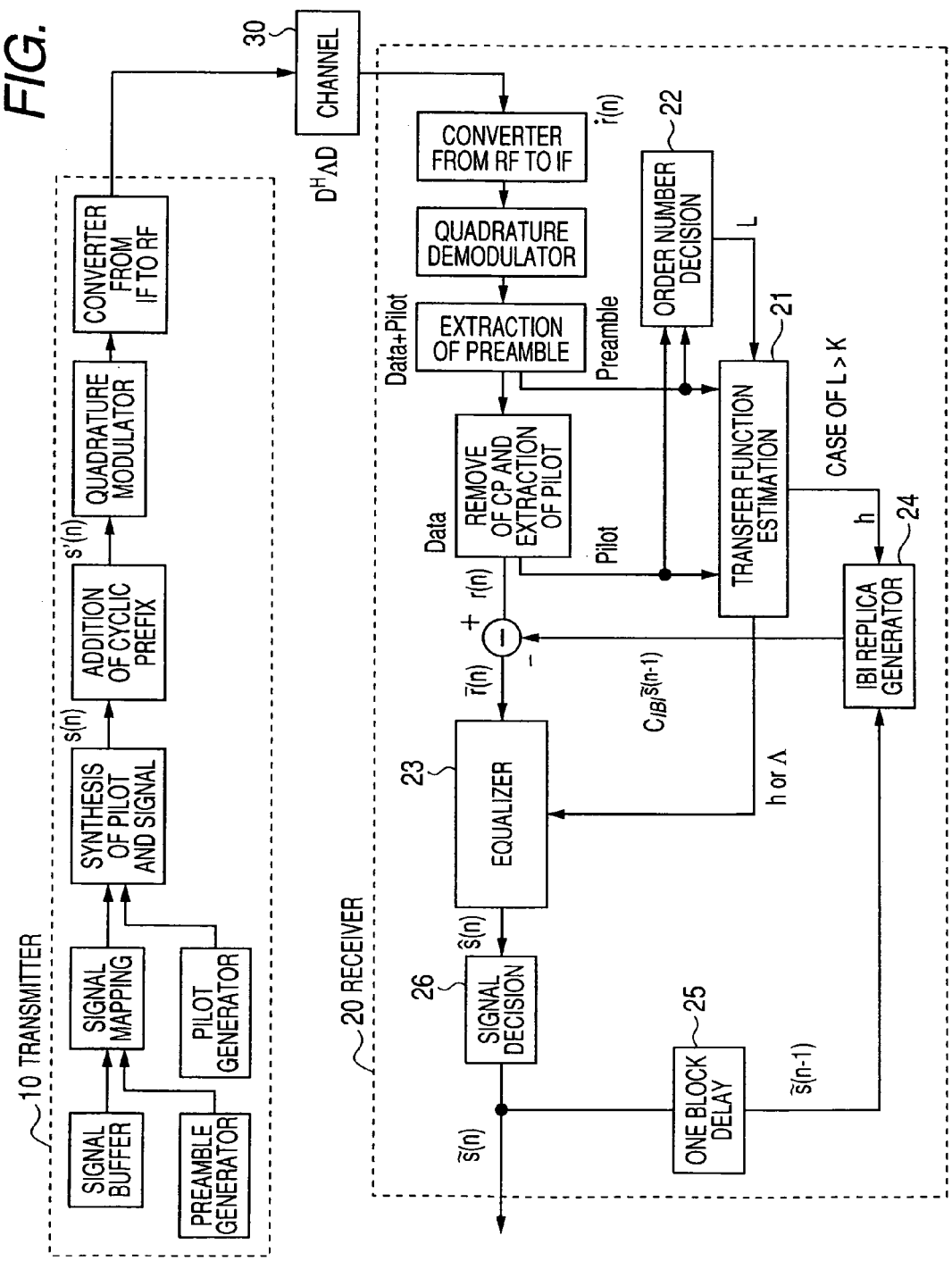
FIG. 1 is a block diagram of a transmission system according to a first embodiment.

Now, an embodiment of the present invention will be described by referring to the drawings.

FIG. 1 is a block diagram of a single carrier block transmission (SC-CP) system to which a cyclic prefix is applied. This transmission system includes a transmitter 10 and a receiver 20. A signal transmitted from the transmitter 10 is received by the receiver 20 via a channel 30.

Figure 2:
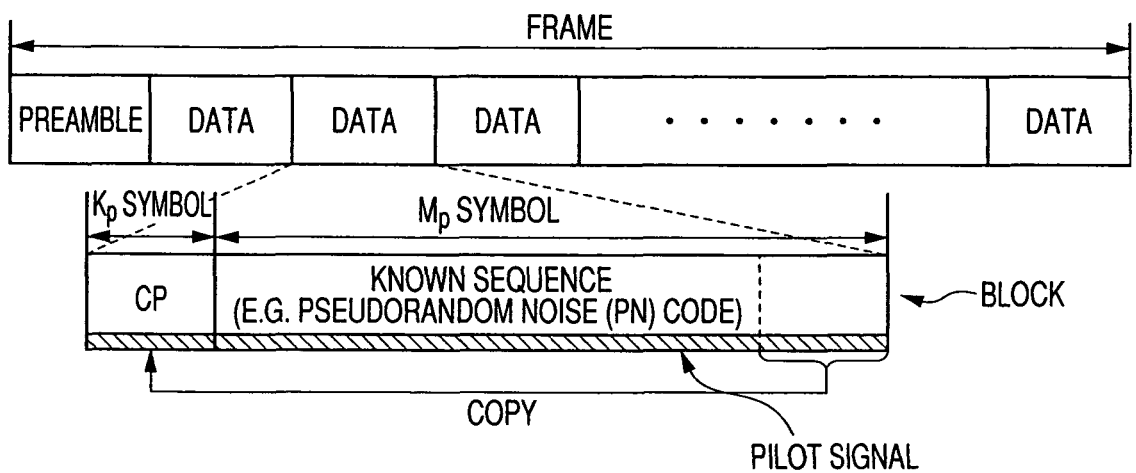
FIG. 2 is a data structural diagram in an SC-CP transmission system.

Further, FIG. 2 shows a transmission data form in the transmission system. As shown in FIG. 2, an object obtained by adding a preamble block (illustrated in FIG. 3) to a plurality of data blocks is called a frame. The data block (sometimes refer it to only as a block, hereinafter) is formed by adding a CP (K symbols) to a plurality of base band signals (M symbols). Normally, a plurality of bits are ordinarily allocated to one symbol. However, herein, only one bit may be allocated to one symbol.

The preamble block (sometimes refer it to only as a preamble, hereinafter) means a known signal added to the head part of the frame. In the single carrier block transmission, the preamble block is used to estimate a frequency transfer function. In addition thereto, the preamble block is used to take a synchronization of clock and carrier frequency in the receiver.

As the preamble, for instance, a PN (Pseudorandom Noise) signal sequence, a chirp signal or the like may be considered. Here, as for the detail of the PN signal, refer to [Mitsuo Yokoyama "Spread Spectrum communication System" scientific technology publishing company p. 393, 6.3 PN Sequence].

The chirp signal is a "sine wave in which a frequency linearly increases" and a method for generating the chirp signal is described in Document [J. Cioffi and J. A. C. Bingham, A Data-Driven Multitone Echo Canceller, IEEE Transactions on Communications, Vol. 42. No. 10, P. 2853-2869, 1994B, p. 2866]. The chirp signal has a merit that amplitude can be made to be fixed both in a time domain and a frequency domain.

Figure 3:
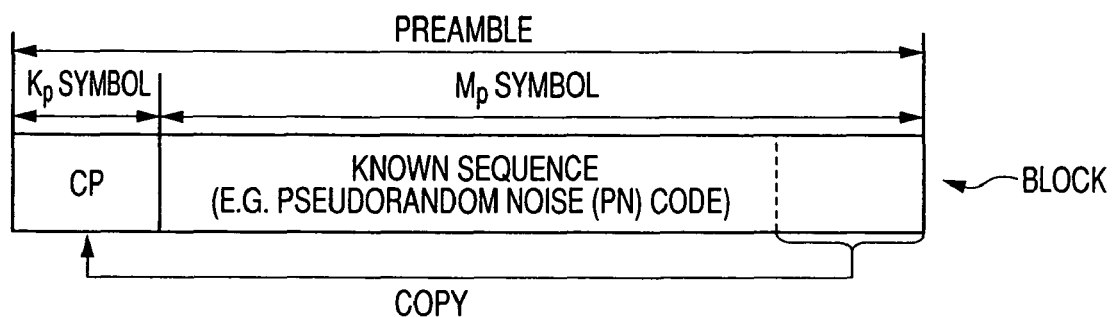
FIG. 3 is an example of a block of a preamble.

A pilot signal is a known signal embedded in a data block and used to estimate a frequency transfer function in the single carrier transmission system. In addition thereto, the pilot signal is used to take a synchronization of clock and carrier frequency in the receiver. For instance, an example that uses the PN sequence suppressed to a data channel is shown in FIG. 3 of Document [K. Hayashi and S. Hara, A New Spatio-Temporal Equalization Method Based on Estimated Channel Response, IEEE Transactions on Vehicular Technology, Vol. 50, No. 5, p. 1250-1259, 2001.].

Returning to FIG. 1, a process in the transmitter 10 side is initially numerically expressed and described.

A transmitted signal is divided into blocks at intervals of M symbols as shown in the above-described equation (1).

Further, in the transmitter 10, the preamble block is also formed and added to the head part of the plurality of data blocks. The preamble block formed here also has a CP and the length Kp of the CP of the preamble is larger than the length K of the CP of the data block. Further, the length Kp of the CP of the preamble is set to be equal to or smaller than a length Mp of a known sequence of the preamble (MP$\geq$Kp$\geq$L>K).

Thus, even when an order number of the channel 30 is larger than the length K of the CP of the data block, the length Kp of the CP of the preamble block is apt to be larger than the order number of the channel 30. Thus, the transfer function can be assuredly estimated in the receiver 20.

Further, since only the length of the CP of the preamble may be increased, the CP of the data block may be shorter than an ordinary length (smaller than the order number of the channel) to improve a channel capacity.

Then, the pilot signal is also formed and synthesized with a transmitted signal block. Further, the cyclic prefix (CP) is added that is formed by copying the last part of the block in the head part.

The frame formed in such a way is modulated to a radio frequency and transmitted to the channel 30.

The receiver 20 receives the signal and demodulates the signal. The receiver 20 includes a transfer function estimating part 21 of the channel. The transfer function estimating part 21 estimates the transfer function (an impulse response) $h=\{h_0, h_1, \ldots, h_L\}$ of the channel 30 on the basis of the preamble or the pilot signal. The transfer function is estimated on the basis of a result obtained from a Fast Fourier transform (FFT) of the preamble or the pilot signal.

The transfer function can be estimated only by the preamble in the head part of the frame, however, the estimated transfer function may be updated (corrected) by the pilot signal synthesized with the block, so that the transfer function of the channel changing dynamically can be more precisely estimated.

Further, the receiver 20 also includes an order number decision part 22 of the channel 30 to estimate the order number L of the channel 30. The order number L may be decided by the Fast Fourier transform (FFT) as in the transfer function estimating part 21 or by an order number deciding algorithm such as an AIC (Akaike Information Criterion) or a MDL (Minimum Description Length) algorithm.

When the order number is decided by the Fast Fourier transform, the order number may be obtained from a maximum delay of a signal when a noise part except the signal is removed by a given threshold value on the basis of the result of the Fast Fourier transform.

The estimated transfer function is supplied to an equalizer 23 for an equalizing process of a received signal. Further, when the order number L of the channel is larger than the length K of the CP (L>K), the estimated transfer function is also supplied to an inter-block interference component (IBI replica) generating part 24.

The inter-block interference component generating part 24 generates, when L>K, an inter-block interference component (IBI replica) from a previous block to a current block. The IBI replica generated in the inter-block interference component generating part 24 is subtracted from the received signal r(n) (the current block) so that the inter-block interference (IBI) component can be reduced and a bit error rate can be improved.

When K≧L, a process for subtracting the replica of the inter-block interference component from the received signal r(n) is not carried out and the usual process described in the background art is carried out.

In the inter-block interference component generating part 24, the IBI replica is generated from the transfer function of the channel 30 supplied from the transfer function estimating part 21 and a decided value of a signal s(n−1) of the previous block.

The decided signal of the previous block is obtained by an equalizing process of the equalizer 23, and is regarded as the transmitted signal s(n−1) of the previous block. It supplied to a next block by a one block delay part 25.

In FIG. 1, even in a signal having the same symbol, a phase or amplitude is not fixed due to the influence of noise. Thus, a signal decision part 26 serves to determine a symbol by a prescribed criterion (a threshold value).

The above-described process for reducing the inter-block interference component is described below in accordance with an equation. Initially, as described above, in the frequency domain equalizer to the single block carrier transmitted signal, when the order number of the channel (physically corresponding to an impulse response length) L is larger than the length K of the CP, a performance is abruptly deteriorated. Specifically, when L>K, since $R_{CP}H_1 \neq 0$, the equation (9) is expressed as described below. Here, $T_{cp}$, $H_0$, $H_1$, $R_{cp}$ are defined in the equations (3), (6), (7) and (10).

[Equation 20]

$$r(n) = R_{CP}H_0 T_{CP}s(n) + R_{CP}H_1 T_{CP}s(n-1) + R_{CP}n'(n) \quad (20)$$
$$= Cs(n) - C_{ISI}s(n) + C_{IBI}s(n-1) + n(n)$$

In this case, $n(n) = R_{CP}n'(n)$.

In the equation (20), $R_{CP}H_0 T_{cp}$, $R_{CP}H_1 T_{cp}$, $C$, $C_{ISI}$, and $C_{IBI}$ are respectively expressed as shown below.

[Equation 21]

$$R_{CP}H_0 T_{CP} = C - C_{ISI} \quad (21)$$

$$= \begin{bmatrix} h_0 & 0 & \cdots & \cdots & \cdots & 0 & h_K & \cdots & h_1 \\ \vdots & h_0 & \ddots & & & & \ddots & \vdots & \vdots \\ \vdots & & \ddots & \ddots & & 0 & h_L & & \vdots \\ \vdots & & & \ddots & \ddots & & \ddots & \ddots & \vdots \\ h_L & & & & \ddots & \ddots & & & h_L \\ 0 & \ddots & & & & \ddots & \ddots & & 0 \\ \vdots & \ddots & \ddots & & & & \ddots & \ddots & \vdots \\ \vdots & & \ddots & \ddots & & & & \ddots & 0 \\ 0 & \cdots & \cdots & 0 & h_L & \cdots & \cdots & \cdots & h_0 \end{bmatrix}$$

[Equation 22]

$$C = \begin{bmatrix} h_0 & 0 & \cdots & 0 & h_L & \cdots & h_1 \\ \vdots & h_0 & \ddots & & \ddots & \ddots & \vdots \\ h_L & & \ddots & \ddots & & \ddots & h_L \\ 0 & \ddots & & \ddots & \ddots & & 0 \\ \vdots & \ddots & \ddots & & \ddots & \ddots & \vdots \\ \vdots & & \ddots & \ddots & & \ddots & 0 \\ 0 & \cdots & \cdots & 0 & h_L & \cdots & h_0 \end{bmatrix} \quad (22)$$

[Equation 23]

$$C_{ISI} = \begin{bmatrix} 0 & \cdots & 0 & h_L & \cdots & h_{K+1} & 0 & \cdots & 0 \\ \vdots & & \ddots & \ddots & \vdots & \vdots & & & \vdots \\ \vdots & & & \ddots & h_L & \vdots & & & \vdots \\ \vdots & & & & 0 & \vdots & & & \vdots \\ \vdots & & & & & \vdots & \vdots & & \vdots \\ 0 & \cdots & \cdots & \cdots & \cdots & 0 & 0 & \cdots & 0 \end{bmatrix} \quad (23)$$

[Equation 24]

$$R_{CP}H_1 T_{CP} = C_{IBI} \quad (24)$$

$$= \begin{bmatrix} 0 & \cdots & 0 & h_L & \cdots & h_K \\ \vdots & & \ddots & \ddots & \vdots \\ \vdots & & & \ddots & h_L \\ \vdots & & & & 0 \\ \vdots & & & & \vdots \\ 0 & \cdots & \cdots & \cdots & 0 \end{bmatrix}$$

In the equation (20) $C_{IBI}s(n-1)$ designates the inter-block interference component from the previous block to the current block and $C_{ISI}s(n)$ designates an inter-symbol interference (ISI) component in the current block that is newly generated depending on whether the length of the cyclic prefix is short or the cyclic prefix does not exist.

In this embodiment, when L is larger than K, "an estimated value of $C_{IBI}$" formed by the "estimated value of the transfer function h" and a "decided value of s (n−1)" are used to form the replica (IBI replica) of the inter-block interference component "$C_{IBI}s(n-1)$" to subtract the IBI replica from the received signal r(n). A signal obtained after the IBI replica is subtracted from the received signal r(n) is expressed by an equation (25).

[Equation 25]

$$\bar{r}(n) = r(n) - C_{IBI}\langle\hat{s}(n-1)\rangle \quad (25)$$
$$= r(n) - C_{IBI}\tilde{s}(n-1)$$
$$\approx (C - C_{ISI})s(n) + n(n)$$

In the signal after the replica is subtracted as shown in the equation (25), the IBI component is reduced and the bit error rate can be improved.

However, in the equation (25), the ISI component still remains. The ISI component is the inter-symbol interference or the interference between the symbols that is newly generated depending on whether the length of the cyclic prefix is short or the cyclic prefix does not exist. As in this embodiment, when the short cyclic prefix length is smaller than the order number of the channel, a new inter-symbol interference component is generated by a delayed signal exceeding the cyclic prefix. Such an inter-symbol interference component cannot be satisfactorily equalized by the usual process described in the background art. The equalizer 23 of this embodiment carries out a calculation of a below-described equation (26) to cancel the ISI component. Here, the equalizer 23 for carrying out the calculation of the equation (26) is referred to as a ZF equalizer.

[Equation 26]

$$\hat{s}_{ZF}(n) = (R_{CP}H_0T_{CP})^{-1}\bar{r}(n) \quad (26)$$

Further, as another calculating equation for canceling the ISI component in the equalizer 23, a below-described equation (27) may be employed. Here, the equalizer 23 for carrying out the calculation of the equation (27) is referred to as an MMSE equalizer.

[Equation 27]

$$\hat{s}_{MMSE}(n) = (R_{CP}H_0T_{CP})^H\left\{R_{CP}H_0T_{CP}(R_{CP}H_0T_{CP})^H + \frac{\sigma_n^2}{\sigma_s^2}I_M\right\}^{-1}\bar{r}(n) \quad (27)$$

Figure 4:
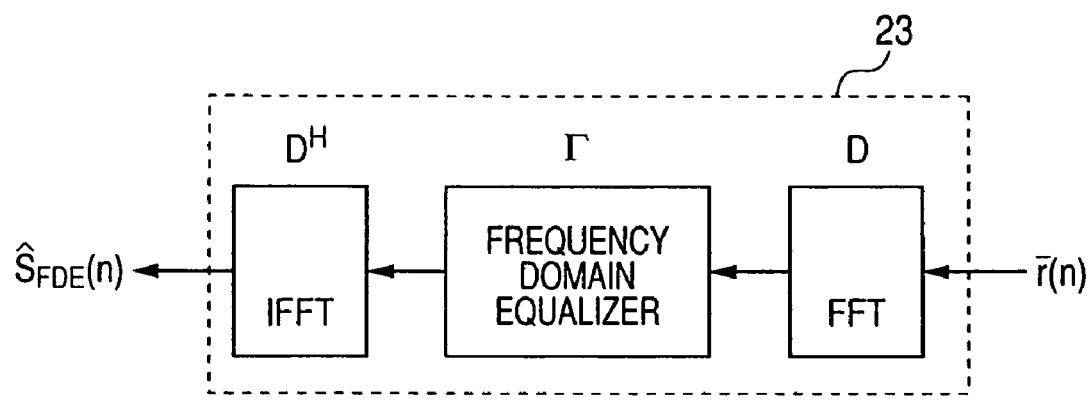
FIG. 4 is a block diagram of an equalizer.

The above-described equations (26) and (27) respectively indicate calculations of time domain and have relatively large computational complexity. Thus, to decrease the computational complexity, the calculation is preferably carried out in the frequency domain. Namely, as another calculating equation for canceling the ISI component in the equalizer 23, an equation (28) is preferable. In FIG. 4, the structure of the equalizer 23 for calculating the equation (28) is shown. Here, the equalizer 23 for carrying out the calculation of the equation (28) is referred to as a frequency domain equalizer.

[Equation 28]

$$\hat{s}_{FDE}(n) = D^H\Gamma D\bar{r}(n) \quad (28)$$

In the equation (28), D designates a DFT matrix expressed by the equation (15). $\Gamma$ designates a diagonal matrix having $\{\gamma_0, \ldots, \gamma_{M-1}\}$ as diagonal elements and is given by below-described equations.

[Equation 29]

$$\gamma_m = \frac{\lambda_m^* - g_{m,m}^*}{|\lambda_m - g_{m,m}|^2 + \sum_{i=0,i\neq m}^{M-1}|g_{m,i}|^2 + \frac{\sigma_s^2}{\sigma_n^2}} \quad (29)$$

[Equation 30]

$$g_{m,n} = \frac{1}{M}\sum_{l=0}^{L-K-1}\sum_{i=0}^{l}h_{L-i}e^{j\frac{2\pi}{M}\{n(M-L+l)-mi\}} \quad (30)$$

[Equation 31]

$$g_{m,n} = \frac{1}{M}\sum_{l=0}^{L-K-1}\sum_{i=0}^{l}h_{L-i}e^{j\frac{2\pi}{M}\{n(M-L+l)-i\}} \quad (31)$$

[Equation 32]

$$\sum_{m=0}^{M-1}|g_{m,n}|^2 = \frac{1}{M}\sum_{l=0}^{L-K-1}\sum_{i=0}^{l}\sum_{l'=0}^{L-K-1}|h_{L-i}|^2 e^{j\frac{2\pi}{M}n(l-l')} \quad (32)$$

Figure 5:
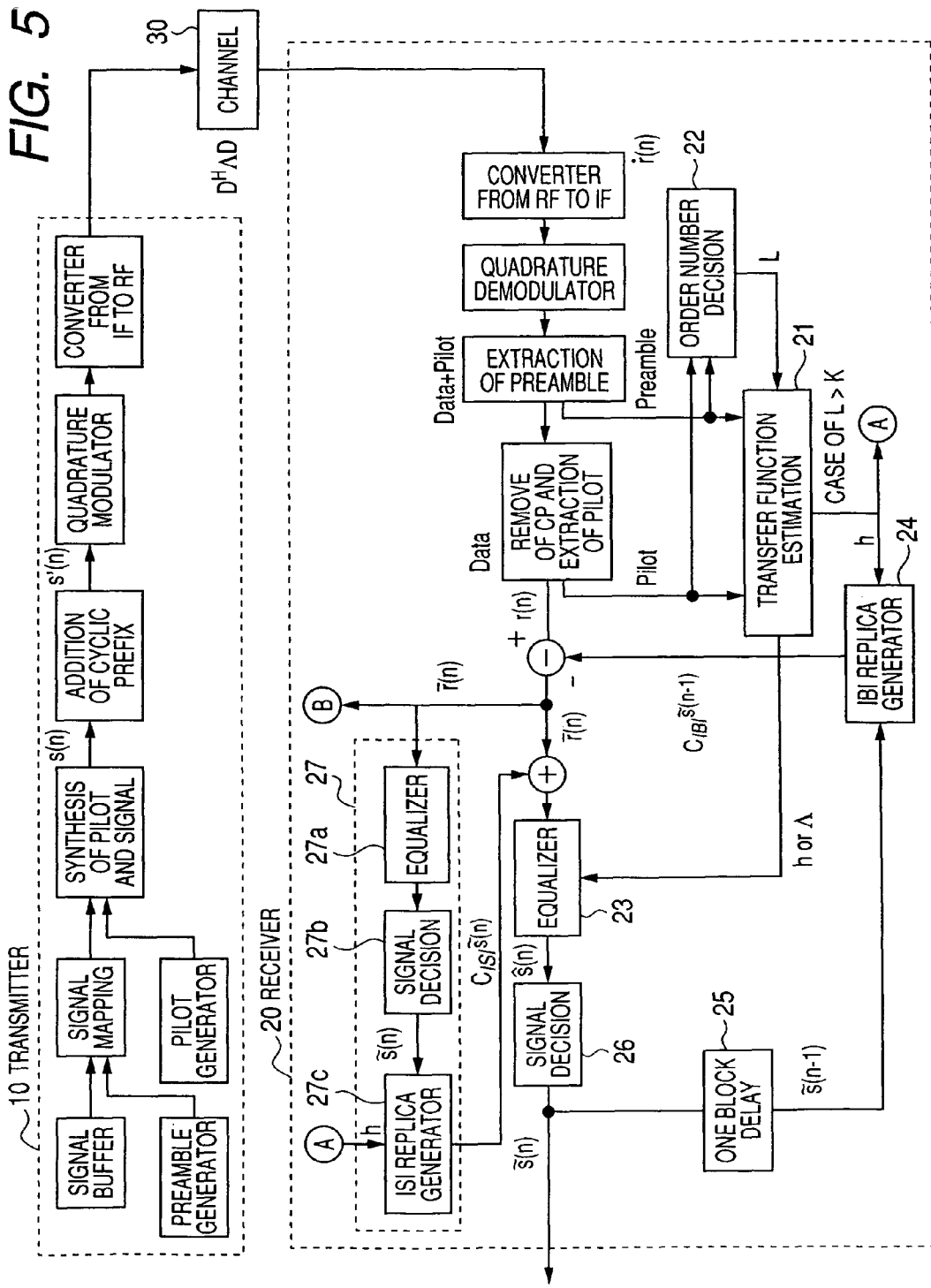
FIG. 5 is a block diagram of a transmission system according to a second embodiment.
Figure 6:
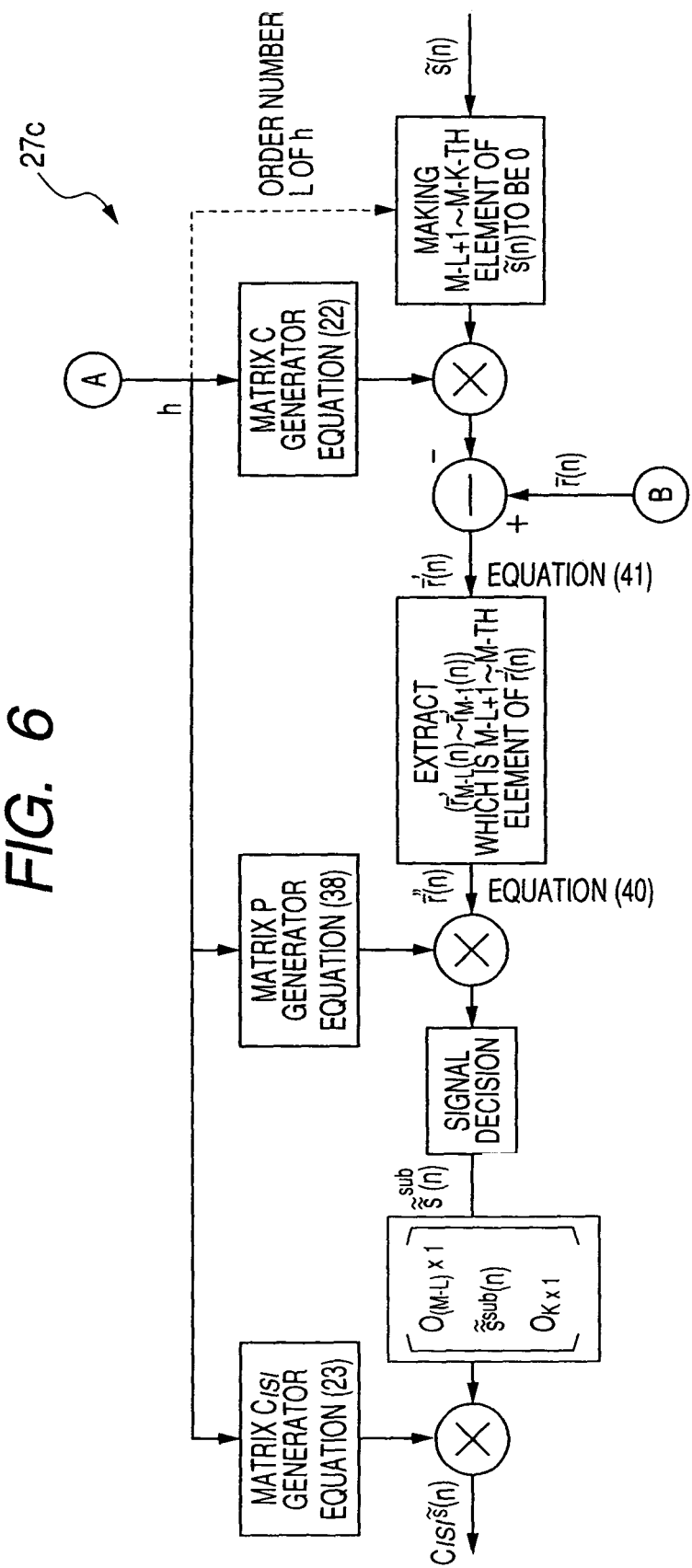
FIG. 6 is a block diagram of an inter-symbol interference component generating part.

FIGS. 5 and 6 show a transmission system according to a second embodiment. In the second embodiment, a part whose explanation is omitted is the same as that of the above-described embodiment.

A receiver 20 of this transmission system has a structure that an inter-symbol interference component generating part 27 for generating a replica of an inter-symbol interference component is added to the receiver 20 shown in FIG. 1 to add the replica of the inter-symbol interference component to a received signal in which the replica of an inter-block interference component is removed.

The inter-symbol interference component generating part 27 includes an equalizer 27a and a signal decision part 27b similar to the equalizer 23 and the signal decision part 26 shown in FIG. 1. A "temporarily decided" transmitted signal block is obtained from a received signal block after the replica of the inter-block interference component is removed by the equalizer 27a and the signal decision part 27b.

The inter-symbol interference component generating part 27 has an ISI replica generating part 27c. This ISI replica generating part 27c generates the replica $C_{ISI}\tilde{s}(n)$ (ISI replica) of the inter-symbol interference component from the temporarily decided transmitted signal block to add the ISI replica to the received signal after the replica (IBI replica) of the inter-block interference component is removed.

The received signal after the ISI replica is added is expressed as shown below.

[Equation 33]

$$\tilde{r}(n) = \bar{r}(n) + C_{ISI}\tilde{s}(n) \approx Cs(n) + n(n) \quad (33)$$

Here, the equalizer 27a of the inter-symbol interference component generating part 27 has the same variations as some variations of calculating equations of the equalizing process in the equalizer 23 in FIG. 1.

That is, the equalizer 27a may carry out any of the calculations of the equation (26), the equation (27) or the equation (28). Further, the equalizer 27a may carry out the calculations of the equation (18) and the equation (19).

When the equalizer 27a uses the equation (26), a result temporarily decided as the transmitted signal in the inter-symbol interference component generating part 27 is expressed by a below-described equation.

[Equation 34]

$$\tilde{s}(n) = \langle\hat{s}_{ZF}(n)\rangle = \langle(R_{CP}H_0T_{CP})^{-1}\bar{r}(n)\rangle \quad (34)$$

Here, $\langle(R_{CP}H_0T_{CP})^{-1}\bar{r}(n)\rangle$ means a result obtained by deciding $(R_{CP}H_0T_{CP})^{-1}\bar{r}(n)$ in a demodulator.

In this case, in the equation (34), <.> indicates a decided result obtained by deciding a signal described in < > in the signal decision part (a demodulator) 27b as described above. The above-described thing is applied to below-described equations (35) and (36).

Further, when the equalizer 27a uses the equation (27), a result temporarily decided as the transmitted signal block in the inter-symbol interference component generating part 27 is expressed by a below-described equation.

[Equation 35]

$$\tilde{s}(n) = \langle \hat{s}_{MMSE}(n) \rangle \qquad (35)$$
$$= \left\langle (R_{CP}H_0T_{CP})^H \left\{ R_{CP}H_0T_{CP}(R_{CP}H_0T_{CP})^H + \frac{\sigma_n^2}{\sigma_s^2} I_M \right\}^{-1} \bar{r}(n) \right\rangle$$

Further, when the equalizer 27a uses the equation (28), a result temporarily decided as the transmitted signal block in the inter-symbol interference component generating part 27 is expressed by a below-described equation.

[Equation 36]

$$\tilde{s}(n) = \langle \hat{s}_{FDE}(n) \rangle = \langle D^H \Gamma D \bar{r}(n) \rangle \qquad (36)$$

Γ designates a diagonal matrix having $\{\gamma_0, \ldots, \gamma_{M-1}\}$ as diagonal elements.

In the equation (36), $\{\gamma_0, \ldots, \gamma_{M-1}\}$ is preferably given by the equations (29) to (32).

In the ISI replica generating part 27c, $C_{ISI}s(n)$ may be simply calculated, however, in order to carry out the calculation at low complexity and improve performance, a structure shown in FIG. 6 is preferably provided to carry out the calculations of below-described equations (37) to (41).

The below-described equation (37) is based on a matrix of $C_{ISI}$ shown in the equation (23) and means that an only submatrix (a specific submatrix G) shown by the below-described equation (38) may be enough to calculate and generate the ISI replica $C_{ISI}s(n)$, and all elements of s(n) is not required.

When the submatrix of the equation (38) is obtained, the performance are improved. This is because the submatrix (the specific submatrix G) shown in the equation (38) does not comprise weak elements (M−L+1 to M−K th element) of s(n) (which is input of the ISI replica generating part 27c) suffered from the influence of the ISI, but strong elements (more definite elements) except the M−L+1 to M−K th elements.

In other words, since the M−L+1 to M−K th elements of M elements suffer from the influence of the ISI more seriously than other elements, the temporarily decided values of s(n) obtained by the signal decision part 27b have a low reliability during a temporary decision. To use this character, as shown in the equation (41), (L−K) elements of the M−L+1 to M−K th elements of the temporarily decided values from the signal decision part 27b are not used in the ISI replica generating part 27c, and the specific submatrix G shown in the equation (38) comprises (M−L) elements of first to M−L th elements and K elements of M−K+1 to M th elements. Therefore, the performance are improved.

[Equation 37]

$$C_{ISI}s(n) = C_{ISI} \begin{bmatrix} 0_{(M-L)\times 1} \\ \tilde{s}^{sub}(n) \\ 0_{K\times 1} \end{bmatrix} \qquad (37)$$

[Equation 38]

$$\tilde{s}^{sub}(n) = \langle P\bar{r}''(n) \rangle \qquad (38)$$
$$= \langle (E^H E)^{-1} E^H \bar{r}''(n) \rangle$$

(Here, $\tilde{s}^{sub}(n)$ designates the above-described specific submatrix G.)

[Equation 39]

$$E = \begin{bmatrix} h_0 & & 0 \\ \vdots & \ddots & \\ \vdots & & h_0 \\ \vdots & & \vdots \\ h_{L-1} & \cdots & h_K \end{bmatrix} \qquad (39)$$

[Equation 40]

$$\bar{r}''(n) = [\bar{r}'_{M-L}(n), \ldots, \bar{r}'_{M-1}(n)]^T \qquad (40)$$

[Equation 41]

$$\bar{r}'(n) = \begin{bmatrix} \bar{r}'_0(n) \\ \vdots \\ \bar{r}'_{M-1}(n) \end{bmatrix} \qquad (41)$$
$$= \bar{r}(n) - C \begin{bmatrix} \tilde{s}_0(n) \\ \vdots \\ \tilde{s}_{M-L-1}(n) \\ 0_{(L-K)\times 1} \\ \tilde{s}_{M-K}(n) \\ \vdots \\ \tilde{s}_{M-1}(n) \end{bmatrix}$$

The present invention is not limited to the above-described embodiments and various modifications may be made without departing the intent of the present invention.

DRAWINGS

FIG. 1
10 transmitter
a signal buffer
b signal mapping
c synthesis of pilot and signal
d addition of cyclic prefix
e quadrature modulator
f converter from IF to RF
g preamble generator
h pilot generator
20 receiver
i case of L>K
j remove of CP and extraction of pilot
k extraction of preamble
l quadrature demodulator
m converter from RF to IF
21 transfer function estimation 22 order number decision
23 equalizer
24 IBI replica generator
25 one block delay
26 signal decision
30 channel
FIG. 2
a frame
b preamble
c data
d Kp symbol
e Mp symbol
f known sequence (e.g. pseudorandom noise (PN) code)
g block
h pilot signal
i copy
FIG. 3
a preamble
b Kp symbol
c Mp symbol
d known sequence (e.g. pseudorandom noise (PN) code)
e block
f copy
FIG. 4
a frequency domain equalizer
FIG. 5
10 transmitter
a signal buffer
b signal mapping
c synthesis of pilot and signal
d addition of cyclic prefix
e quadrature modulator
f converter from IF to RF
g preamble generator
h pilot generator
20 receiver
i case of L>K
j remove of CP and extraction of pilot
k extraction of preamble
l quadrature demodulator
m converter from RF to IF
21 transfer function estimation
22 order number decision
23 equalizer
24 IBI replica generator
25 one block delay
26 signal decision
27a equalizer
27b signal decision
27c ISI replica generator
30 channel
FIG. 6
a matrix $C_{ISI}$ generator
  equation (23)
b matrix P generator
  equation (38)
c matrix C generator
  equation (22)
d order number L of h
e signal decision
f equation (40)
g extract $(\bar{r}'_{M-L}(n) \sim \bar{r}'_{M-1}(n))$ which is M−L+1∼M-th element of $\bar{r}(n)$
h equation (41)
i making M−L+1∼M−K-th element of $\tilde{s}(n)$ to be 0

Figure 7:
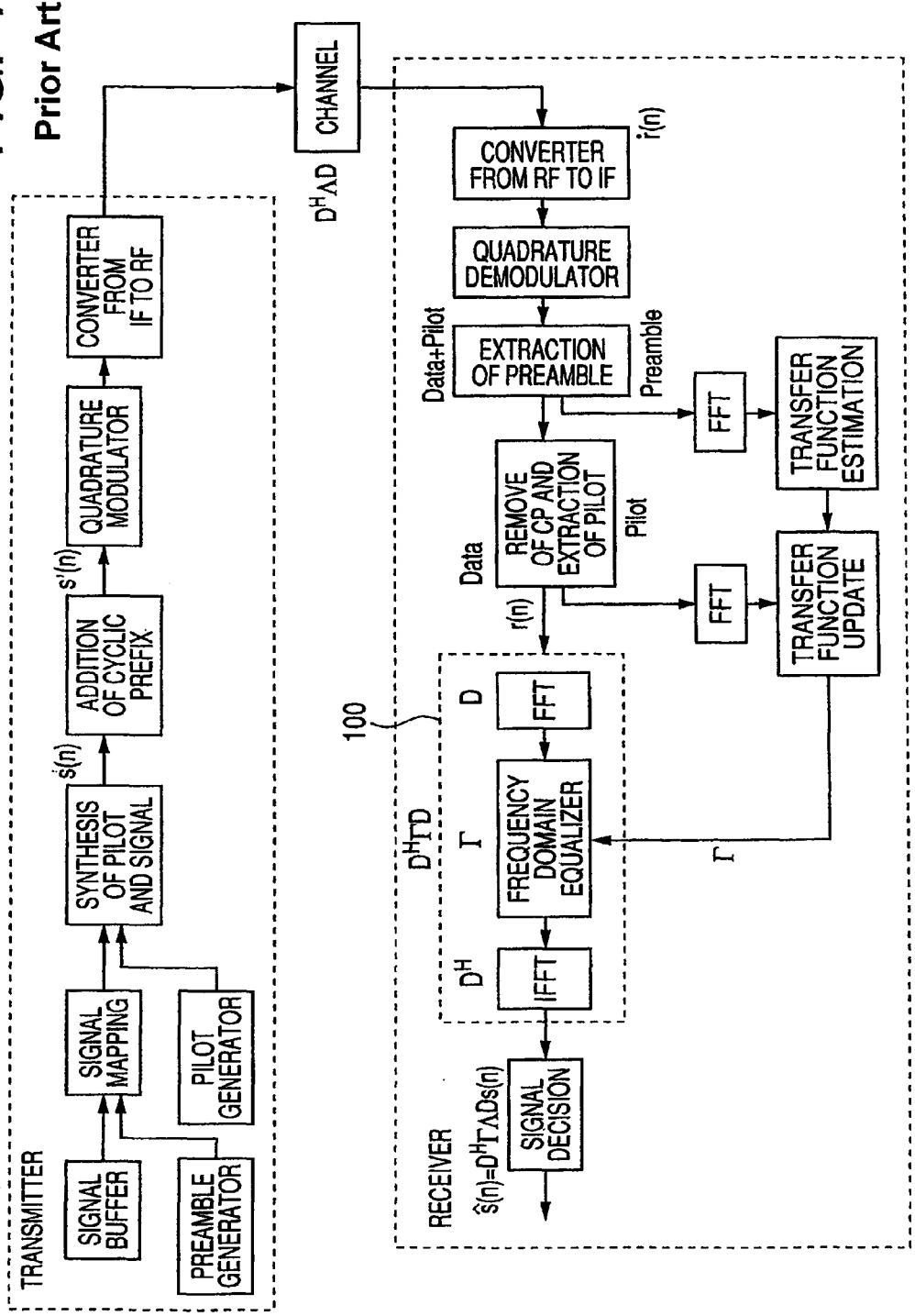
FIG. 7 is a block diagram of a transmission system on the assumption that the length K of a CP is an order number L of the channel or larger.

FIG. 7
A transmitter
a signal buffer
b signal mapping
c synthesis of pilot and signal
d addition of cyclic prefix
e quadrature modulator
f converter from IF to RF
g preamble generator
h pilot generator
B receiver
i signal decision
j frequency domain equalizer
k remove of CP and extraction of pilot
l extraction of preamble
m quadrature demodulator
n converter from RF to IF
o transfer function update
p transfer function estimation
C channel

The invention claimed is:

1. A receiver for a transmission system using a block including symbols, said receiver comprising:
a transfer function estimating part that estimates a transfer function of a channel;
an inter-block interference component generating part that generates a replica of an inter-block interference component from a previous block to a current block in accordance with the transfer function estimated in the transfer function estimating part and a received signal of the previous block, characterized in that the inter-block interference component of the received signal is reduced by using the replica of the inter-block interference component; and
an equalizer that carries out a process for reducing an interference component between the symbols caused by whether a cyclic prefix length is small or cyclic prefix does not exist from the received signal in which the inter-block interference component is reduced.

2. A receiver for a transmission system using a block including symbols, said receiver comprising:
a transfer function estimating part that estimates a transfer function of a channel;
an inter-block interference component generating part that generates a replica of an inter-block interference component from a previous block to a current block in accordance with the transfer function estimated in the transfer function estimating part and a received signal of the previous block, characterized in that the inter-block interference component of the received signal is reduced by using the replica of the inter-block interference component; and
an equalizer that carries out a process for reducing an interference component between the symbols by performing a calculation according to any one of below-described equations (A), (B) and (C) with respect to the received signal from which the inter-block interference component is reduced:

[Equation 1]

$$\hat{s}_{ZF}(n) = (R_{CP} H_0 T_{CP})^{-1} \bar{r}(n), \quad (A)$$

$$\hat{s}_{MMSE}(n) = \quad (B)$$
$$(R_{CP} H_0 T_{CP})^H \left\{ R_{CP} H_0 T_{CP} (R_{CP} H_0 T_{CP})^H + \frac{\sigma_n^2}{\sigma_s^2} I_M \right\}^{-1} \bar{r}(n),$$

$$\hat{s}_{FDE}(n) = D^H \Gamma D \bar{r}(n), \quad (C)$$

where, $\bar{r}(n)$ designates a received signal block in which the inter-block interference component is reduced,
$\hat{s}_{ZF}(n)$ designates an output of the equalizer,
$\hat{s}_{MMSE}(n)$ designates an output of the equalizer,
$\hat{s}_{FDE}(n)$ designates an output of the equalizer,
$R_{CP}$ designates a matrix for removing a redundant signal, and
$H_0$ designates a matrix expressed as described below when it is assumed that an impulse response of a channel is $h=\{h_0, h_1, \ldots, h_L\}$, $$H_0 = \begin{bmatrix} h_0 & & & \\ \vdots & h_0 & & 0 \\ h_L & & \ddots & \\ & \ddots & & \ddots \\ 0 & & h_L & \ldots & h_0 \end{bmatrix},$$

where matrix size is $(M+K)\times(M+K)$, M indicates a length of a block excluding a redundant signal, and K indicates a length of a cyclic prefix,
$T_{CP}$ designates a matrix for adding a redundant signal,
$I_M$ designates a unit matrix of M×M,
$\sigma_s^2$ is a variance of a signal s(n) and,
$\sigma_n^2$ is a variance of noise n(n);

D is expressed by a below-described equation, [Equation 2]

$$D = \begin{bmatrix} 1 & 1 & \ldots & 1 \\ 1 & e^{-j\frac{2\pi\times 1\times 1}{M}} & \ldots & e^{-j\frac{2\pi\times 1\times(M-1)}{M}} \\ \vdots & \vdots & \ddots & \vdots \\ 1 & e^{-j\frac{2\pi\times(M-1)\times 1}{M}} & \ldots & e^{-j\frac{2\pi\times(M-1)\times(M-1)}{M}} \end{bmatrix},$$

where M designates a length of a block excluding a redundant signal,
Γ designates a diagonal matrix having $\{\gamma_0, \ldots, \gamma_{M-1}\}$ as diagonal elements and is given by below-described equations, $$\gamma_m = \frac{\lambda_m^* - g_{m,m}^*}{|\lambda_m - g_{m,m}|^2 + \sum_{i=0,i\neq m}^{M-1}|g_{m,i}|^2 + \frac{\sigma_s^2}{\sigma_n^2}},$$

where x* designates a complex conjugate of x and $\Lambda = \{\lambda_0, \ldots, \lambda_{M-1}\}$ designates a discrete Fourier transform of an impulse response of a channel $h=\{h_0, h_1, \ldots, h_L\}$, $$g_{m,n} = \frac{1}{M}\sum_{l=0}^{L-K-1}\sum_{i=0}^{l}h_{L-i}e^{j\frac{2\pi}{M}\{n(M-L+l)-mi\}},$$

$$g_{m,m} = \frac{1}{M}\sum_{l=0}^{L-K-1}\sum_{i=0}^{l}h_{L-i}e^{j\frac{2\pi}{M}\{n(M-L+l)-i\}}, \text{ and}$$

$$\sum_{m=0}^{M-1}|g_{m,n}|^2 = \frac{1}{M}\sum_{l=0}^{L-K-1}\sum_{i=0}^{l}\sum_{l'=0}^{L-K-1}|h_{L-i}|^2 e^{j\frac{2\pi}{M}n(l-l')}.$$

3. A receiver for a transmission system using a block including symbols, said receiver comprising:
a transfer function estimating part that estimates a transfer function of a channel;
an inter-block interference component generating part that generates a replica of an inter-block interference component from a previous block to a current block in accordance with the transfer function estimated in the transfer function estimating part and a received signal of the previous block, characterized in that the inter-block interference component of the received signal is reduced by using the replica of the inter-block interference component; and
an inter-symbol interference component generating part that generates a replica of an interference component between the symbols in the current block in accordance with the received signal in which the inter-block interference component is reduced and the estimated transfer function of the channel,
wherein the interference component between the symbols of the received signal is reduced by using the replica of the interference component between the symbols.

4. The receiver according to claim 3, wherein the inter-symbol interference component generating part carries out a calculation by any one of below-described equations (D), (E) and (F) to get a decided value of a transmitted signal block used for generating the replica of the interference component between the symbols from the received signal in which the inter-block interference component is reduced:

[Equation 3]

$$\tilde{s}(n) = \langle \hat{s}_{ZF}(n) \rangle \qquad (D)$$
$$= \langle (R_{CP}H_0 T_{CP})^{-1}\bar{r}(n)\rangle,$$

$$\tilde{s}(n) = \langle \hat{s}_{MMSE}(n) \rangle \qquad (E)$$
$$= \left\langle (R_{CP}H_0 T_{CP})^H \begin{Bmatrix} R_{CP}H_0 T_{CP}(R_{CP}H_0 T_{CP})^H + \\ \frac{\sigma_n^2}{\sigma_s^2}I_M \end{Bmatrix}^{-1} \bar{r}(n)\right\rangle,$$

$$\tilde{s}(n) = \langle \hat{s}_{FDE}(n) \rangle \qquad (F)$$
$$= \langle D^H \Gamma D \bar{r}(n)\rangle,$$

where, $\bar{r}(n)$ designates a received signal block in which the inter-block interference component is reduced,
$\hat{s}_{ZF}(n)$ designates an output of the equalizer,
$\hat{s}_{MMSE}(n)$ designates an output of the equalizer,
$\hat{s}_{FDE}(n)$ designates an output of the equalizer,
$\tilde{s}(n)$ designates a decided value of a transmitted signal block,
$R_{CP}$ designates a matrix for removing a redundant signal, and
$H_0$ designates a matrix expressed as described below when it is assumed that an impulse response of a channel is $h=\{h_0, h_1, \ldots, h_L\}$, $$H_0 = \begin{bmatrix} h_0 & & & \\ \vdots & h_0 & & 0 \\ h_L & & \ddots & \\ & \ddots & & \ddots \\ 0 & & h_L & \ldots & h_0 \end{bmatrix}$$

where matrix size is (M+K)×(M+K), M indicates a length of a block excluding a redundant signal, and K indicates a length of a cyclic prefix, $T_{CP}$ designates a matrix for adding a redundant signal, <.> indicates a result obtained by deciding a signal in < >, $I_M$ designates a unit matrix of M×M, $\sigma_s^2$ is a variance of a signal s(n) and, $\sigma_n^2$ is a variance of noise n(n);

D is expressed by a below-described equation, $$D = \begin{bmatrix} 1 & 1 & \cdots & 1 \\ 1 & e^{-j\frac{2\pi \times 1 \times 1}{M}} & \cdots & e^{-j\frac{2\pi \times 1 \times (M-1)}{M}} \\ \vdots & \vdots & \ddots & \vdots \\ 1 & e^{-j\frac{2\pi \times (M-1) \times 1}{M}} & \cdots & e^{-j\frac{2\pi \times (M-1) \times (M-1)}{M}} \end{bmatrix},$$

where M designates a length of a block excluding a redundant signal, and $\Gamma$ designates a diagonal matrix having a weight $\{\gamma_0, \ldots, \gamma_{M-1}\}$ of an equalizer in a discrete frequency domain as a diagonal element.

5. The receiver according to claim 4, wherein $\gamma_m$ (m=0 to M−1) in the equation (F) of claim 4 is given by a below-described equation:

$$\gamma_m = \frac{\lambda_m^* - g_{m,m}^*}{|\lambda_m - g_{m,m}|^2 + \sum_{i=0, i \neq m}^{M-1} |g_{m,i}|^2 + \frac{\sigma_s^2}{\sigma_n^2}}, \quad \text{[Equation 4]}$$

where x* designates a complex conjugate of x and $\Lambda = \{\lambda_0, \ldots, \lambda_{M-1}\}$ designates a discrete Fourier transform of an impulse response of a channel h={$h_0, h_1, \ldots, h_L$}, $$g_{m,n} = \frac{1}{M} \sum_{l=0}^{L-K-1} \sum_{i=0}^{l} h_{L-i} e^{j\frac{2\pi}{M}\{n(M-L+l)-mi\}},$$

$$g_{m,n} = \frac{1}{M} \sum_{l=0}^{L-K-1} \sum_{i=0}^{l} h_{L-i} e^{j\frac{2\pi}{M}\{n(M-L+l)-i\}}, \text{ and}$$

$$\sum_{m=0}^{M-1} |g_{m,n}|^2 = \frac{1}{M} \sum_{l=0}^{L-K-1} \sum_{i=0}^{l} \sum_{l'=0}^{L-K-1} |h_{L-i}|^2 e^{j\frac{2\pi}{M}n(l-l')}.$$

6. The receiver according to claim 3, wherein the inter-symbol interference component generating part is designed to generate the replica of the interference component between the symbols in accordance with below-described equations:

$$C_{ISI}s(n) = C_{ISI} \begin{bmatrix} 0_{(M-L) \times 1} \\ \tilde{s}^{sub}(n) \\ 0_{K \times 1} \end{bmatrix}, \quad \text{[Equation 5]}$$

where $C_{ISI}s(n)$ designates a replica of an interference component between symbols, $$C_{ISI} = \begin{bmatrix} 0 & \cdots & 0 & h_L & \cdots & h_{K+1} & 0 & \cdots & 0 \\ \vdots & & & \ddots & \ddots & \vdots & \vdots & & \vdots \\ \vdots & & & & \ddots & h_L & \vdots & & \vdots \\ \vdots & & & & & 0 & \vdots & & \vdots \\ \vdots & & & & & & \vdots & & \vdots \\ 0 & \cdots & \cdots & \cdots & \cdots & 0 & 0 & \cdots & 0 \end{bmatrix},$$

$$\tilde{s}^{sub}(n) = \langle P\bar{r}''(n) \rangle$$
$$= \langle (E^H E)^{-1} E^H \bar{r}''(n) \rangle,$$

where <.> shows a result obtained by deciding a signal in < >, and $$E = \begin{bmatrix} h_0 & & 0 \\ \vdots & \ddots & \\ \vdots & & h_0 \\ \vdots & & \vdots \\ h_{L-1} & \cdots & h_K \end{bmatrix}; \quad \text{[Equation 6]}$$

$$\bar{r}''(n) = [\bar{r}'_{M-L}(n), \ldots, \bar{r}'_{M-1}(n)]^T,$$

$$\bar{r}'(n) = \begin{bmatrix} \bar{r}'_0(n) \\ \vdots \\ \bar{r}'_{M-1}(n) \end{bmatrix}$$

$$= \bar{r}(n) - C \begin{bmatrix} \tilde{s}_0(n) \\ \vdots \\ \tilde{s}_{M-L-1}(n) \\ 0_{(L-K) \times 1} \\ \tilde{s}_{M-K}(n) \\ \vdots \\ \tilde{s}_{M-1}(n) \end{bmatrix},$$

where $\bar{r}(n)$ designates a received signal block in which an inter-block interference component is reduced, $\tilde{s}(n) = \{\tilde{s}_0(n), \ldots, \tilde{s}_{M-L-1}(n)\}$ designates a decided value of a transmitted signal block, h={$h_0, h_1, \ldots, h_L$} designates an impulse response of a channel, and $$C = \begin{bmatrix} h_0 & 0 & \cdots & 0 & h_L & \cdots & h_1 \\ \vdots & h_0 & \ddots & & \ddots & \ddots & \vdots \\ h_L & & \ddots & & & \ddots & h_L \\ 0 & \ddots & & \ddots & & & 0 \\ \vdots & \ddots & \ddots & & \ddots & \ddots & \vdots \\ \vdots & & \ddots & \ddots & & \ddots & 0 \\ 0 & \cdots & \cdots & 0 & h_L & \cdots & h_0 \end{bmatrix}.$$

* * * * *